US005133104A

United States Patent [19]

Maubray

[11] Patent Number: 5,133,104

[45] Date of Patent: Jul. 28, 1992

[54] WINDSHIELD WIPER BLADE AND A WIPING STRIP FOR SUCH A BLADE

[75] Inventor: Daniel Maubray, Issy-Les-Moulineaux, France

[73] Assignee: Valeo Systemes d'Essuyage, Montigny-Le-Bretonneux, France

[21] Appl. No.: 638,792

[22] Filed: Jan. 8, 1991

[30] Foreign Application Priority Data

Jan. 11, 1990 [FR] France ............................... 90 00291

[51] Int. Cl.$^5$ ............................................. B60S 1/38

[52] U.S. Cl. ................................................ 15/250.36

[58] Field of Search ........... 15/250.36, 250.41, 250.42, 15/103, 250.12, 245, 250.01, 250.02, 250.03; D12/155

[56] References Cited

U.S. PATENT DOCUMENTS

| | | | |
|---|---|---|---|
| 1,853,715 | 4/1932 | Anderson | 15/250.36 |
| 3,428,997 | 2/1969 | Rickett | 15/250.36 |
| 3,473,186 | 10/1969 | Mainka | 15/250.36 |
| 3,545,028 | 12/1970 | Poland | 15/250.36 |
| 3,717,900 | 2/1973 | Quinlan et al. | 15/250.36 |
| 3,903,560 | 9/1975 | Jewell et al. | 15/250.36 |
| 3,930,279 | 1/1976 | Arman | 15/250.36 |
| 4,030,159 | 6/1977 | Centoducati | 15/250.36 |
| 4,543,682 | 10/1985 | Kessler et al. | 15/250.36 |
| 4,723,336 | 2/1988 | Nakayama | 15/250.41 |

FOREIGN PATENT DOCUMENTS

| | | | |
|---|---|---|---|
| 0232598 | 8/1987 | European Pat. Off. | 15/250.41 |
| 854398 | 1/1940 | France | 15/250.36 |
| 1250889 | 12/1960 | France . | |
| 2628047 | 9/1989 | France . | |
| 0034963 | 2/1984 | Japan | 15/250.36 |
| 7409913 | 1/1976 | Netherlands | 15/250.36 |

OTHER PUBLICATIONS

Patent Abstracts of Japan, vol. 10, No. 261 Sep. 4, 1986 (JP 61 85245 Apr. 30, 1986).

*Primary Examiner*—Harvey C. Hornsby
*Assistant Examiner*—Gary Graham
*Attorney, Agent, or Firm*—Dennison, Meserole, Pollack & Scheiner

[57] ABSTRACT

The invention is concerned mainly with a wiping strip for a windshield wiper blade, the strip comprising a base and a wiping element for wiping contact with a surface. The wiping element is articulated on the base through a web portion which is protected from deposits of mud, ice etc. by two wing portion which also improve the aerodynamic performance of the wiping strip. The invention is particularly applicable to equipment for automotive vehicles.

9 Claims, 1 Drawing Sheet

WINDSHIELD WIPER BLADE AND A WIPING STRIP FOR SUCH A BLADE

FIELD OF THE INVENTION

This invention relates to windshield wiper blades, and to flexible wiping strips for such blades. It is particularly applicable in connection with the wiping of glasses or windshields, especially in automotive vehicles.

BACKGROUND OF THE INVENTION

In the prior art, windshield wipers have been made that include a blade which is moved over the surface to be swept, for example a windshield, under the action of a motor. Such windshield wipers include at least one oscillating arm which carries a blade that includes a wiping strip. The wiping strip generally comprises a base and a scraping or wiping element. The wiping strip is carried by the blade which is articulated on the arm, with the latter applying the blade firmly against the swept surface while moving it in an oscillating movement.

In order to overcome problems of mechanical behaviour, for example noisiness, it is known to articulate the base on the wiping element itself by interposing a web between these two portions of the wiping strip. Such a web may be defined by one or more cavities formed along the wiping strip.

Such arrangements have deceptive aerodynamic behaviour, in particular at high speeds. Under the effect of eddies of air, lateral overpressures tend to occur, which cause the wiping strip to undergo a constraint which tends to oppose the required angular deformation about the web.

In addition, such an overpressure can induce a braking effect in the movements of the windshield wiper blade: this needs to be avoided, for example under high-stress driving conditions in a high speed vehicle.

Another problem has become apparent under certain wiping conditions. Thus, when the blade sweeps the surface of the windshield, it often happens that the region around the web can become clogged by accumulations of foreign matter, for example, ice or mud comprising a mixture of dust and water. This reduces the ability of the strip to flex at the web, which is damaging both to performance and to the structure of the strip. In addition, such accumulations of matter can be transferred onto the windshield.

In French patent No. 1 250 889, a wiping strip has been proposed which is protected from the surrounding air, since it is disposed within a mask in the form of a channel or gutter carried by the windshield wiper arm itself. The main drawback of that arrangement is that ingress of dust and accumulation of ice during snowfall are not in fact prevented, for example between the channel and the wiping strip itself. It is therefore possible to reach a point at which the channel is full of dust and ice and the wiping strip is therefore unable to function properly. In addition, the channel is a supplementary component of a windshield wiper, which adds to the cost of the wiper assembly.

In the solution of another problem that has been proposed in the prior art, it is known to arrange for the wiping strip to be stiffened in such a way that the windshield wiper remains permanently in contact over its whole length with the swept surface. With this in view, the upper part of the base, i.e. the part opposite the web, is formed with a recess or cavity in which a vertebra or stiffener can be fitted. This arrangement increases the risks of braking of the windshield wiper blade and, more particularly, of clogging by mud or ice.

DISCUSSION OF THE INVENTION

An object of the present invention is to provide a remedy for the drawbacks of prior art arrangements mentioned above, and to improve the performance of windshield wiper and similar wiping systems, the invention being directed to a windshield wiper wiping strip of the kind comprising a base and a wiping element which are joined to each other through a web portion. The invention is mainly characterised in that the wiping element includes two wing portions which are arranged on either side of its greatest cross sectional dimension and which are arranged so as to mask cavities provided on the wiper blade, in particular during displacements of the blade, in such a way as to protect the said cavities against variations in pressure of aerodynamic origin, and against accumulations of matter such as ice or dust.

The invention also embraces a windshield wiper blade which is equipped with such a wiping strip.

Further features and advantages of the present invention will be better understood from the following description, given by way of example and with reference to the accompanying drawings.

DESCRIPTION OF PREFERRED EMBODIMENTS OF THE INVENTION

Figure 1:
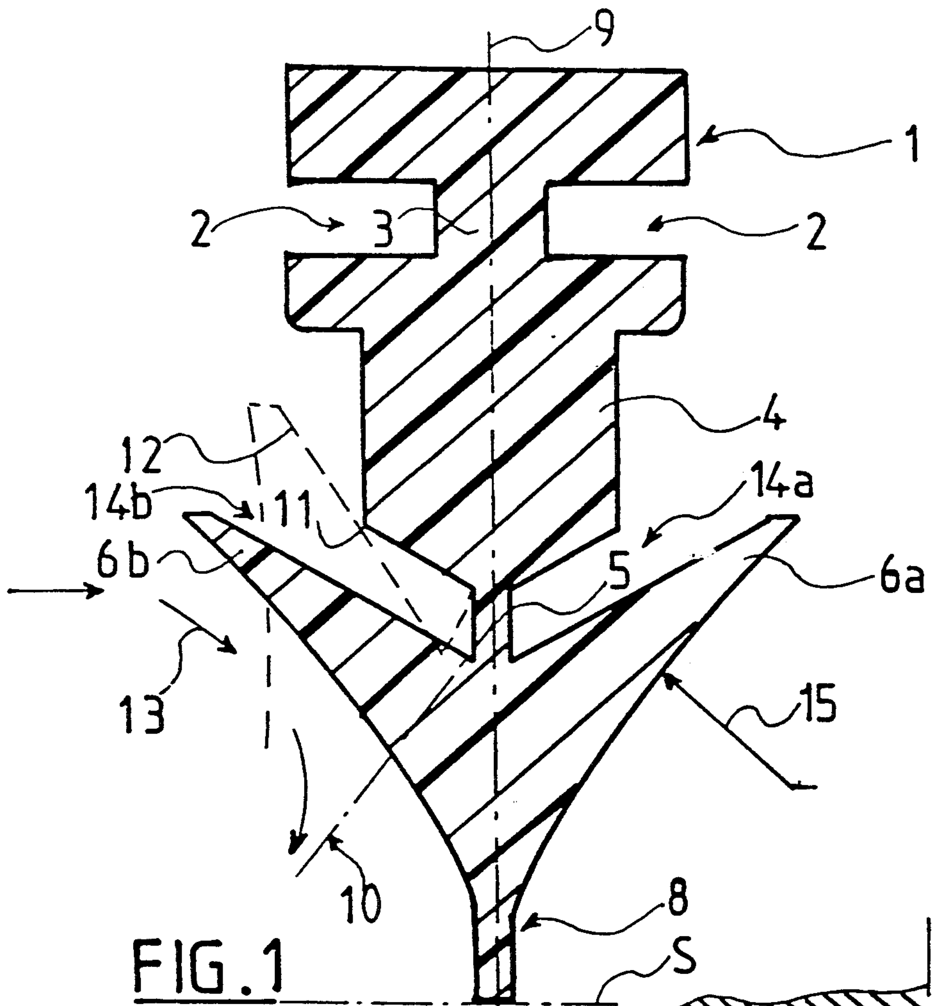
FIG. 1 is a view in cross section showing a first embodiment of the invention.

In FIG. 1, a wiper blade in the said first embodiment has as its main features a base 1 and a wiping element 8, which is articulated on a base 1 through a web portion 5. As thus described, such an arrangement is conventional. Two longitudinal cavities 2 are provided in the base 1, defining between them a central spine portion 3. The cavities 2 are formed between the upper or terminal portion of the base 1 and a body portion 4 of the base, with the web portion 5 projecting from the body portion 4. The purpose of the cavities 2 is to receive a stiffening rib (not shown), which is also referred to as a vertebra and which enables the transverse configuration of the wiper blade to be improved.

The wiping element 8 is formed with two wing portions *6a*, *6b*, on either side. The wiping element 8 engages the swept surface S, which is indicated in FIG. 1 by a phantom line. The windshield wiper blade is symmetrical about a central plane indicated at 9 in FIG. 1, along which the greatest cross sectional dimension of the wiping strip is measurable. When the blade is stationary the surface S is perpendicular to the plane 9. The wing portions *6a* and *6b* extend outwardly and in the longitudinal direction of the plane 9 away from the wiping element 8, in such a way as to be capable of masking body cavities, 14*a* and 14*b*, in a direction substantially perpendicular to plane 9. Said cavities being defined between the wing portions, the web portion 5 and the body portion 4 of the base.

Each of the wing portion *6a*, *6b* has an inner or upper surface or face facing towards the base 1, and an outer or lower surface of face facing away from it.

It will be appreciated that currents or eddies of air 13 are guided by the curvature 15 of the outer face of the wing portion 6a or 6b. In order to improve the dynamic behaviour of the wiper blade during a wiping movement, the outer faces of the wing portions are formed with aerodynamic profiles.

In one embodiment, the outer face of each wing portion is concave outwards, being in the form of a portion of a cylinder, the centre of curvature of which is disposed on the same side of the wing portion as the swept surface S. A typical value for this radius of curvature is 11.5 cm. Such a wing profile is beneficial to the aerodynamic performance of the wiper blade during operation on the swept surfaces.

It will also be understood that the length of the wing portions is such that the cavities 14a and 14b are permanently masked in a direction substantially perpendicular to said plane 9, as shown in FIG. 1, regardless of the angle through which the web portion 5 is deflected. In this way the greater part of the risk of the cavities 14a and 14b being filled with deposits of ice, dust or snow is avoided.

The angular deflection of the web portion 5 can be limited to a predetermined value by suitable design of the profile of the wing portions 6a and 6b. Thus, during angular deflection, the inner face 12 of one of the wing portions comes into contact, as indicated in broken lines at 11, with the body portion 4 of the base 1, to define a fully deflected position indicated in broken lines at 10, so that further angular deformation of the wiper blade about its web portion 5 is elastically prevented.

In order to avoid friction noise and other parasitic effects, the profile of the inner faces of the wing portions 6a and 6b is chosen to be such that the possible contact area between these inner surfaces and the body portion 4 of the base 1 will be reduced to a minimum.

Figure 2:
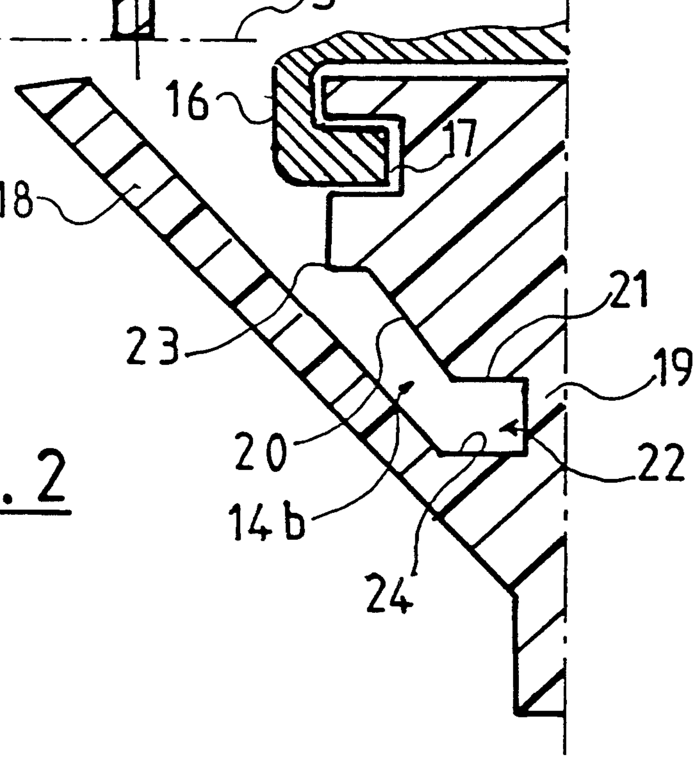
FIG. 2 is a partial cross section showing a second embodiment of the invention.

In another embodiment, which is shown in FIG. 2, a stiffener 16 is installed at the outer end of the base 1 in the cavities 17 which correspond substantially to the cavities 2 in FIG. 1. The wing portions 18 extend past and beyond the cavities 17, as shown, in such a way that they guarantee good protection for the whole of the wiper blade.

The web portion 19 extends from a frustoconical portion 20 of the base 1, to define a groove which enables air flow to be controlled. During angular deflection of the web portion 19, the inner surface of the wing portion 18 comes into engagement against a shoulder 23 defined at the outer end of the frustoconical portion 20.

In a preferred embodiment, cavities 22, in the form of longitudinal grooves, are provided at the level of the web portion 19 and on either side of the latter. These cavities are formed on each side of the wiper blade and are continuous with the cavities 14a and 14b already described; the lower or inner surface 24 of each cavity 22 is an extension of the inner surface of the corresponding wing portion 18. The frustoconical portion 20 is extended at the level of the web portion by a radially extending inner terminal cavity portion defined by a wall 21.

The frustoconical portion 20 of the base has an inclination such that the contact area between the base and the wing portion 18 during angular deformation is reduced to a minimum. This inclination may be made variable, if desired, by making this part of the base with a curved surface.

Again in a preferred embodiment, and as is shown in the drawing, the angle made between each wing portion 18 and the central plane 9 (FIG. 1) is about 47°, the wing portions being symmetrical about the greatest dimension of the wiper blade cross section, i.e. that in the plane 9. The frustoconical portion 20 of the base is itself arranged symmetrically on an apex half-angle of 40°, the value of this angle being smaller than the angle between each wing portion and the plane 9.

The wiper blade may be made by extrusion in synthetic rubber.

The invention is of course not limited to the particular embodiments described above, but embraces any embodiment within the scope of the invention.

What is claimed is:

1. A flexible wiping strip for a windshield wiper assembly, said wiping strip comprising an elongated unitary flexible plastic structure symmetrically arranged in cross section around a central plane (9), said wiping strip comprising a substantially rectangular base portion (1) having a pair of base cavities (2 or 17) symmetrically arranged with respect to said central plane to form a relatively fixed spine (3), a stiffening element mounted within said base cavities, a body portion (4) depending from said base and having symmetrically disposed sides of reduced lateral extent in comparison with said base, said laterally disposed sides of said body portion having angular portions forming an acute angle with respect to said plane, a flexible web portion (5 or 19) depending from said body portion and symmetrically disposed on said plane, said flexible web portion having a width much less than said body portion, a wiping element (8) depending from said web portion, said wiping element having a pair of wings (6a, 6b or 18) forming a V-shape embracing and extending beyond said body portion, each wing having a surface spaced from and overlying said angular portion of said body portion to define a pair of body cavities (14a, 14b) therebetween, each said body cavity having a side opening facing away from said plane, the free end portion of each wing extending above said side opening to mask said opening in a direction substantially perpendicular to said plane when said flexible plastic structure is symmetrically arranged around said central plane whereby air flowing substantially perpendicular to said plane against said wing will be deflected away from said opening, and said wiping element having a portion engaging a surface (S) to be wiped whereby movement of said wiper element over said surface, to be wiped effects deflecting motion of said wiping element around said web portion between end positions defined by contact between said wing portions and said body or base portions.

2. A wiping strip according to claim 1, wherein each wing portion is so configured as to cover the corresponding said side opening of each body cavity (14a, 14b) completely when a said deflection occurs.

3. A wiping strip according to claim 1, wherein each wing portion is of such a length as to mask the whole of the corresponding side of said base and body portions in a direction substantially perpendicular to said plane.

4. A wiping strip according to claim 1, wherein each wing portion has an external surface (15) directed away from the web portion and said external surface having an aerodynamic profile.

5. A wiping strip according to claim 4, wherein the said external surfacce of each wing portion is concavely curved.

6. A wiping strip according to claim 1, wherein said surface of each wing portion is so configured as to make contact with the base, though only minimal contact, on the occurrence of a said angular deformation.

7. The wiping strip according to claim 1, wherein said V-shaped wings embrace said body portion at least to the extent of masking said body cavities (14*a*, 14*b*) in a direction substantially perpendicular to said plane to prevent the ingress of dirt.

8. The wiping strip according to claim 1 wherein said open body cavities (14*a*, 14*b*) comprise plural linear sides when said wiping element is in a non-deflected position.

9. The wiping strip according to claim 1 wherein said acute angle between a lateral portion and said plane is approximately 40° while each said V-shaped wing forms an angle of approximately 47° with said plane.

* * * * *